E. H. MEAD.
HAND TRUCK.
APPLICATION FILED JAN. 22, 1914.

1,135,603.

Patented Apr. 13, 1915.

Witnesses:

Inventor:
Ellis H. Mead
By
Attys

UNITED STATES PATENT OFFICE.

ELLIS H. MEAD, OF WESTERN SPRINGS, ILLINOIS, ASSIGNOR TO MIEHLE PRINTING PRESS & MANUFACTURING COMPANY, OF CHICAGO, ILLINOIS, A CORPORATION OF ILLINOIS.

HAND-TRUCK.

1,135,603.  Specification of Letters Patent.  Patented Apr. 13, 1915.

Application filed January 22, 1914. Serial No. 813,642.

*To all whom it may concern:*

Be it known that I, ELLIS H. MEAD, a citizen of the United States, residing at Western Springs, in the county of Cook and State of Illinois, have invented certain new and useful Improvements in Hand-Trucks, of which the following is a specification.

My invention relates to devices for receiving and transporting articles, and has particular reference to a novel truck which shall be normally immobile.

In the receiving and transporting of many articles it is desirable to provide a truck which shall be rigid or immobile when in receiving position, but which may be readily moved from place to place as required. I am aware that this has been accomplished to a certain extent by providing a platform having rigid-supports, then placing beneath said platform a wheeled-truck, raising the platform and its load, and transporting the same by means of the truck. This construction has many disadvantages, not the least in importance being that of first cost. A further disadvantage is in the amount of space required for a device of that sort.

My invention contemplates a truck which shall be provided with a platform, said platform having a wheeled-support at one point and a rigid-support at another point, the point of the truck which is rigidly supported being adapted to be raised by a wheeled lifting lever, thus transforming the rigid, immobile table to a wheeled truck.

Figure 1:
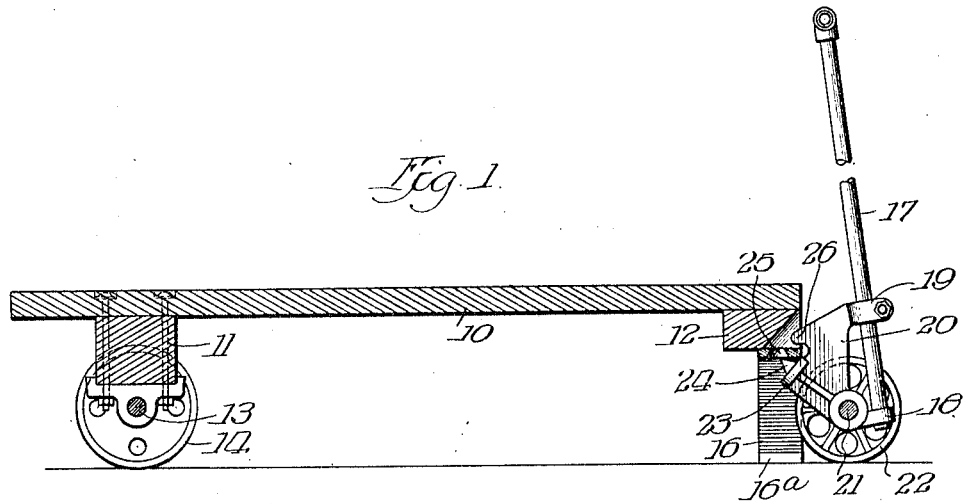
Figure 2:
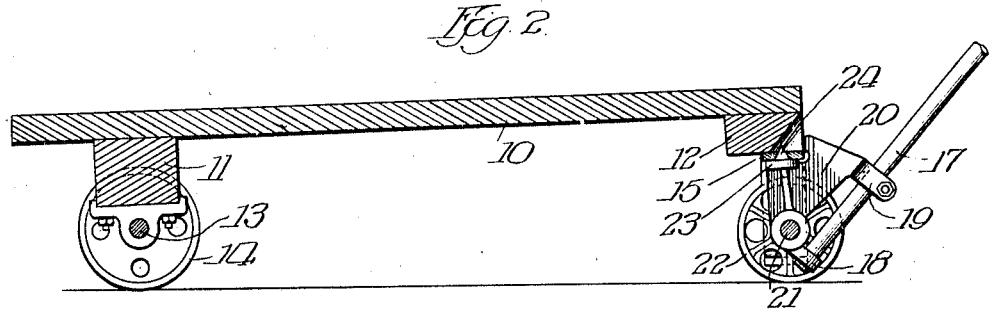
Figure 3:
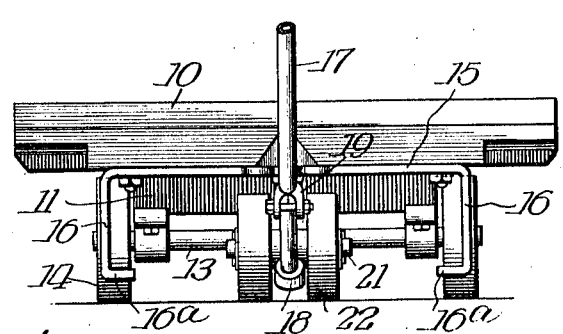
Figure 4:
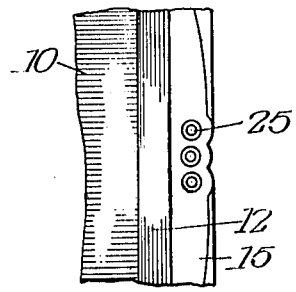

The invention will be more readily understood by reference to the accompanying drawings, wherein, Figure 1 is a longitudinal vertical section through a truck constructed in accordance with my invention, the wheeled lifting lever being shown as about to be applied to the truck; Fig. 2 is a similar view showing the lifting lever in place after having raised the one end of the truck to disconnect its rigid support from the floor; Fig. 3 is a front elevation with the lifting element in place, and Fig. 4 is a fragmentary bottom plan view showing the form of connection for the lifting lever to the platform.

Referring more particularly to the drawings, it will be seen that I provide a table or frame 10 to the lower portion of which are secured cross members 11, 12. To the cross member 11 is secured an axle or shaft 13, on the ends of which are mounted wheels 14. On the forward cross member is provided an elongated U-bar 15, the downwardly projecting legs 16, of which act as supports for that end of the truck in normal position. The ends of the legs 16 may be turned at right angles as at 16ª if desired, in order to provide a broad support. By this construction a rigid, immobile, receiving table is provided. However, assuming that the table and any superposed load is to be transported, I provide a lifting lever consisting of a handle 17, mounted at its lower end in a socket and clamp 18, 19, carried by a casting 20. This casting provides a bearing for a short shaft 21, on which a pair of wheels 22, are mounted. Also connected to said casting is an annular bearing 23, from the upper surface of which a conical stud 24 is projected. The axis of the conical stud is located at an acute angle to the longitudinal axis of the handle. On the under surface of the bar 15, as shown in Fig. 4, I provide a plurality of conical recesses 25, within any one of which the stud 24 is adapted to be seated. By providing a plurality of spaced recesses the stud on the lifting lever may be positioned in the one located whereby to balance the load to best advantage.

In order to assist in positioning the stud in one of the recesses 25, I provide on the casting 20, a web extending parallel with the handle 17, this web carrying a hook adapted to coöperate with the bar 15, and prevent the stud 24 from being pushed so far beneath the truck that it will not engage with a recess 25. This will be found a great convenience in positioning the lifting lever.

Assuming the platform 10 is to be transported, the wheeled lifting lever is located as shown in Fig. 1, and the handle moved in an arc around the axle 21. That end of the platform is then lifted and supported by the wheels 22, whereupon the truck may be moved as desired, and when located and the lifting lever removed, becomes again an immobile stand or table.

I claim:

1. In a truck, the combination of a platform, non-rotatable supports at its front end, a separate wheeled lifting lever to coöperate with said platform and adapted to lift the same at its front end, and means to permit of the lifting lever being engaged with the front of the platform at any one of a plurality of positions thereon.

2. In a truck, the combination of a platform, non-rotatable supports for the front end thereof, and a separate wheeled lifting lever to coöperate with said platform and adapted to lift the same, and means to permit of the lifting lever being engaged with the platform at any one of a plurality of positions including recesses disposed in a row transversely on the bottom of said platform.

3. In a truck, the combination of a platform, non-rotatable supports comprising a bar secured to the bottom of said platform and terminating in downwardly projecting legs, said bar being provided with a plurality of transverse holes, and a separate wheeled lifting lever having an element for engaging any one of the holes in said bar and adapted to lift said truck.

4. In a wheeled lifting lever for trucks, a casting, a handle, a socket on the side of said casting to receive an end of said handle and a clamp extending from said casting to secure said handle in position.

5. In a wheeled lifting lever for trucks, a casting having a truck engaging element, a lip on said casting extending over said engaging member to guide the same when applying the lifting lever to a truck and a handle for the casting.

6. In a wheeled lifting lever for trucks, a casting, an axle and wheels carried at the rear of said casting, a truck engaging element located above and in substantially vertical alinement with said axle in the operative position of the device, a handle secured to the front of said casting, and a lip extending over said engaging member to guide the same into engagement with a truck.

7. In a truck, the combination of a platform having non-rotatable supports at its front end comprising a bar secured to the bottom of said platform and provided with a plurality of holes, said platform being provided with a recess bridging the holes in said bar, and a separate wheeled lifting lever provided with a member for engaging any one of the holes in said bar and adapted to lift the truck.

8. In a truck, the combination of a platform, non-rotatable supports for one end of the platform comprising a bar secured to the bottom of said truck and provided with a plurality of holes, said platform having a recess bridging the holes in said bar, and a separate wheeled lifting lever having a member for engaging with any one of the holes in the bar and adapted to lift the platform, a lip extending over said bar and extending into the recess to guide said lifting lever when applying it to the platform.

ELLIS H. MEAD.

Witnesses:
B. D. STEVENS,
M. A. PERKINS.